May 4, 1937.  J. W. MYERS ET AL  2,079,382
AUTOMATIC TOASTER
Filed April 15, 1935   2 Sheets-Sheet 1
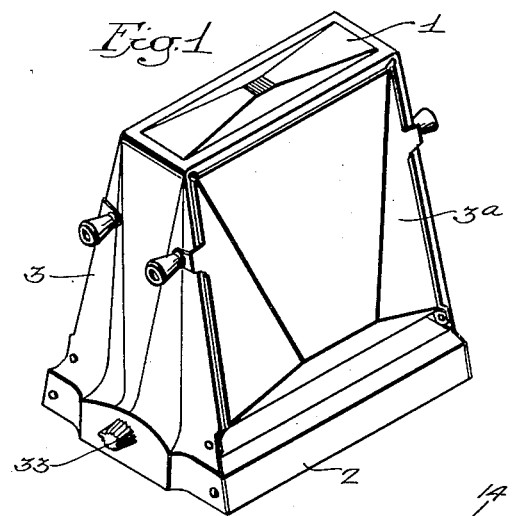
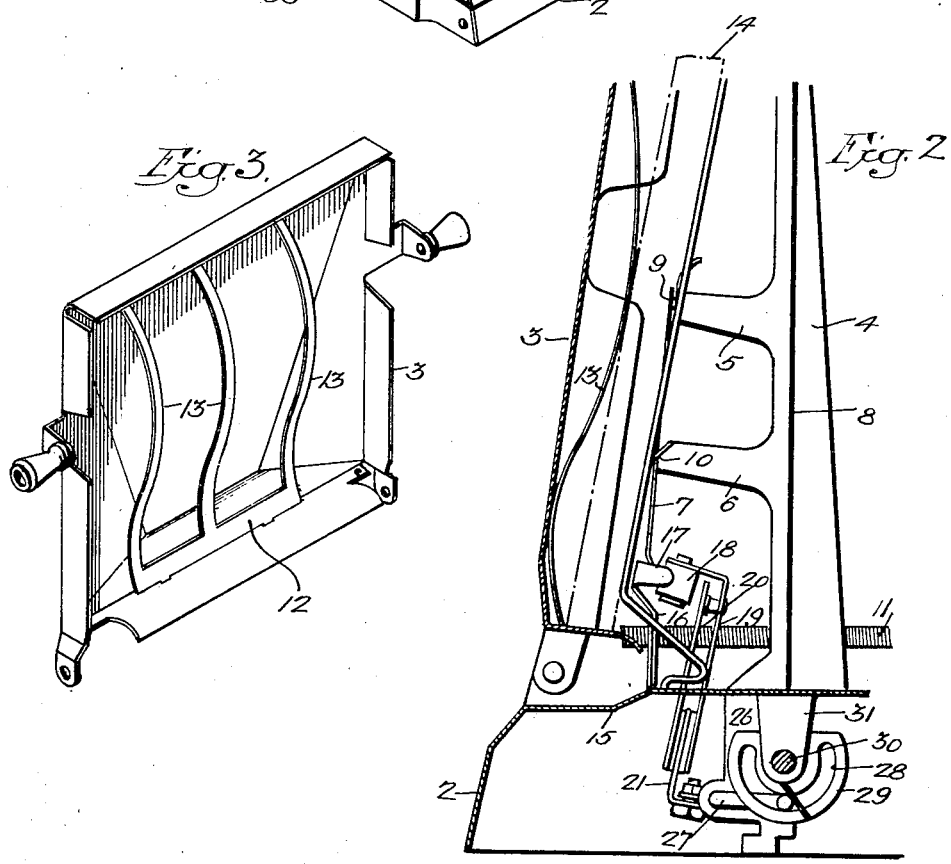
Inventors.
Joseph W. Myers
George M. Biddinger
by their Attorneys
Howson & Howson May 4, 1937. J. W. MYERS ET AL 2,079,382
AUTOMATIC TOASTER
Filed April 15, 1935 2 Sheets-Sheet 2
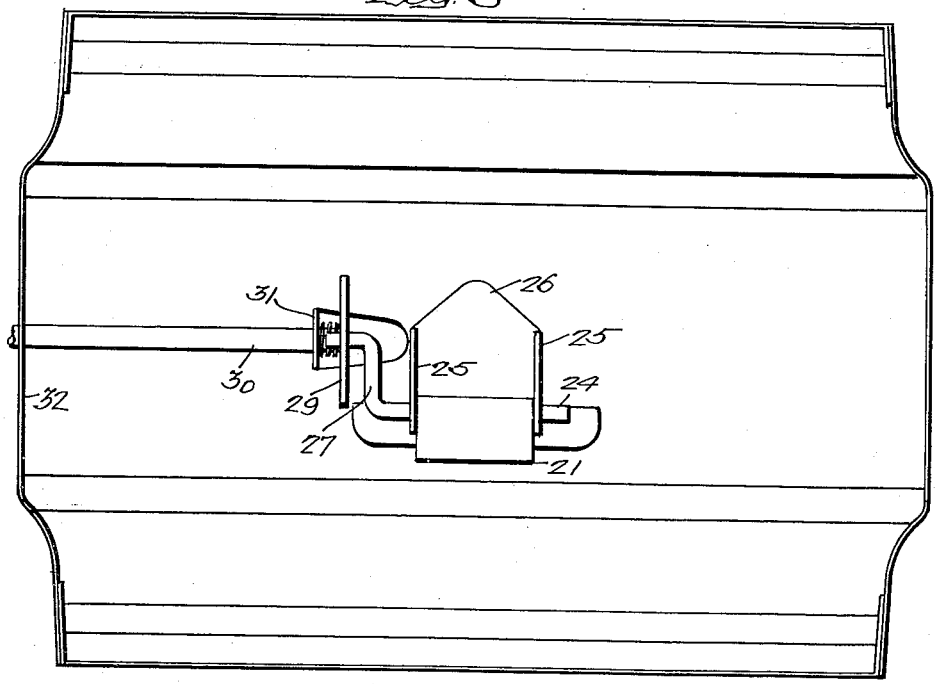
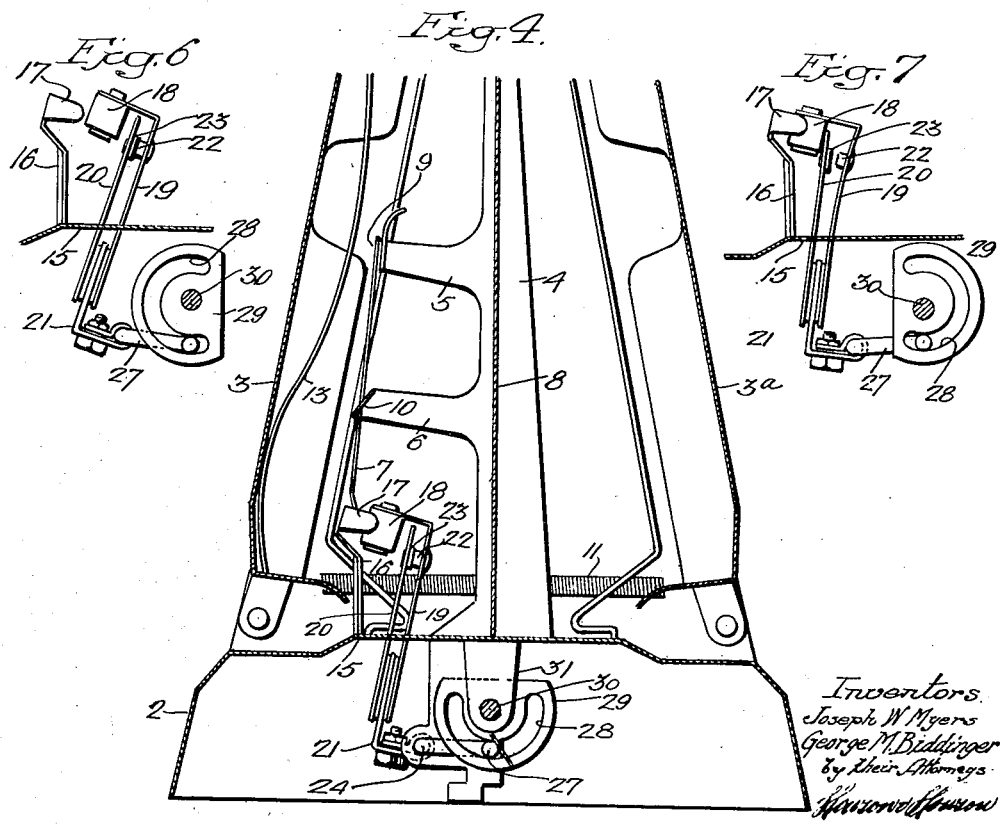
Inventors
Joseph W. Myers
George M. Biddinger
by their Attorneys Patented May 4, 1937

2,079,382

UNITED STATES PATENT OFFICE 2,079,382

AUTOMATIC TOASTER

Joseph W. Myers and George M. Biddinger, Philadelphia, Pa., assignors, by mesne assignments, to Proctor & Schwartz, Inc., Philadelphia, Pa., a corporation of Pennsylvania Application April 15, 1935, Serial No. 16,514

10 Claims. (Cl. 219—19)

This invention relates to thermostatically-controlled bread toasters of the type disclosed in the United States patent to Hurxthal et al. No. 1,540,628, granted June 2, 1925. In a toaster of this type, the electrical circuit is controlled by a thermostatic switch employing a heat-responsive element which is arranged to contact the surface of a piece of bread being toasted. In this manner, the toasting operation is controlled in accordance with the surface temperature of the bread, which surface temperature varies directly in accordance with the degree of toasting, as taught by the Hurxthal et al. patent. The present invention, while relating generally to this type of toaster, is directed specifically to the form of toaster known as a "turn-over" toaster in which there are provided hinged doors on the opposite sides of the device adapted to support slices of bread, one on each side of the heating element or unit in proper relation thereto. One object of the invention is to provide an improved device of this character which is simple in construction and capable of low cost manufacture.

Another object of the invention is to provide a toaster of the specified type which is more reliable and more accurate than previous devices of this class by virtue of more uniform contact of the bread with the heat-responsive element and by virtue of simplified adjustment of the thermostat control.

A further object of the invention is to provide a device having certain novel features which collectively and cooperatively render the device more efficient and more accurately controllable.

The invention may be clearly understood by reference to the accompanying drawings illustrating a preferred form of toaster embodying the novel features.

In the drawings:

Fig. 1 is a perspective view of the toaster;

Fig. 2 is a fragmentary sectional view taken transversely of the toaster illustrating a novel feature;

Fig. 3 is a perspective view of one of the hinged doors showing more clearly a feature of the invention;

Fig. 4 is a fragmentary sectional view showing the features of the invention;

Fig. 5 is a face view of the bottom of the toaster showing the adjustable control mechanism;

Fig. 6 is a fragmentary view showing the switching mechanism in a certain position; and Fig. 7 is a similar view showing the thermostat control switch in another position.

As stated above, the invention is directed particularly to a toaster of the "turn-over" type, such as illustrated in Fig. 1. This device comprises the body portion 1 having a hollow base 2 and opposed hinged doors 3 and 3a which are hinged at their bottoms and are adapted to support slices of bread.

Referring to Figs. 2 and 4, there is provided a support 4 having extending arms 5 and 6 which serve to support the heat-responsive element 7. The support 4 is preferably located centrally of the toaster with the arms 5 and 6 extending transversely toward the door 3. The heating element of the toaster may comprise sections arranged on each side of the support 4 upon insulating support plates 8, which may be formed of mica for example. The heat-responsive element 7 may take the form of a bimetallic strip and this element may be attached at one end to the arm 5, as at 9, and may extend through a slot provided at the end of arm 6, as at 10. The lower end of the heat-responsive element is free for movement when the element flexes under the influence of heat as well known. This serves to control the electrical circuit of the device in a manner which will be presently described.

The heat-responsive element is arranged in such position that it is contacted by a piece of bread on that side of the device where the said element is located. The doors 3 and 3a are shaped to serve as supports for the slices of bread to be toasted, as seen clearly in Fig. 3, and they are urged to closed position by a light spring 11 extending transversely of the device at one side thereof and having its ends connected respectively to the hinged doors. Due to variation in thickness of bread slices within the ordinary range thereof, the slice of bread on the thermostat side of the device is not always held in proper contact with the heat-responsive element and, therefore, in accordance with the invention, there is provided on the door 3 means for pressing the slice of bread against the heat-responsive element regardless of the thickness of the bread slice within the ordinary range thereof. This feature may comprise a frame 12 (see Fig. 3) fixedly carried by the door 3 and having a plurality of convex pressure bars 13. The inwardly convexed portions of these bars are adapted to exert uniform pressure against the bread slice to maintain the same in proper engagement with the heat-responsive element, as shown in Fig. 2, the bread slice being shown in outline at 14. Thus, regardless of the thickness of the bread slice within the usual range, it is maintained in proper contact with the heat-responsive element so that the thermostatic control is always effected accurately. As well known, in this type of toaster, when a door is opened, the bread turns over automatically because the bottom of the bread slice slides outwardly along the door and the slice assumes a turned-over or reversed position on the door. This desirable feature is not interfered with in any way by the provision of the frame 12, as this frame allows the bread to turn over in the customary manner.

Referring now to Figs. 2, 4, and 5, there is provided on the base wall 15 of the toaster an upwardly-extending stationary stop arm 16, whose upper end is adapted to serve as a stop for the free end of the heat-responsive element 7 and which end has inwardly-extending stop portions 17 arranged for engagement by a small insulating barrel 18 carried by the thermostatic switch contact finger 19. The spring finger 19 is carried, together with an associated spring finger 20, upon a supporting bracket 21, being insulated therefrom by insulating spacers. The spring fingers 19 and 20 carry contacts 22 and 23, respectively, which constitute the switch elements.

The switch-supporting bracket 21 is fixedly secured to a rod or shaft 24 (see Fig. 5) which is journaled in depending walls 25 of a bracket 26 secured to the base wall 15. The rod or shaft 24 has formed at one end thereof a crank arm 27, the bent end of which extends through and rides in the eccentric slot 28 of a cam 29. The cam 29 is carried upon the end of a rod or shaft 30 which is journaled in a bracket 31 and the end wall 32 of the toaster. The outer end of this rod or shaft extends through the wall 32 and carries an adjusting knob 33 (see Fig. 1).

The turning of the cam 29 imparts slight rotation to the crank arm 27 and to the rod or shaft 24, thus varying the position of the thermostatic switch in relation to the heat-responsive element. In operation, the free end of the heat-responsive element engages the insulating barrel 18 as the said end moves inwardly during flexing of the heat-responsive element under the influence of the surface temperature of the bread. As the end of the heat-responsive element continues to move inwardly, it moves the upper part of the spring finger 19, thus separating the switch contacts and opening the circuit of the device. It will be seen that the position of the thermostatic switch elements in relation to the heat-responsive element will determine the degree of toasting of the bread, since the amount of movement of the lower end of the heat-responsive element is dependent upon the position of the switch elements and the insulating barrel 18. In Fig. 4, the cam is shown adjusted to medium position, while in Fig. 6, it is shown adjusted to an extreme position which has caused the thermostatic switch elements to move to substantially maximum distance away from the heat-responsive element. In the case of Fig. 4, therefore, the toasting of the bread will be medium, while in the case of Fig. 6, the toasting will be to a greater degree or, in other words, until the bread is well done.

In addition to serving for adjustment of the degree of toasting of the bread, the device is designed to serve as a manually-operable switch. To this end, the slotted cam 29 is designed so as to have an increased throw at one end to cause continued rotation of the rod or shaft 24 after the insulating barrel 18 has engaged the stops 17. This causes opening of the switch contacts, as shown in Fig. 7, since the spring finger 19 is flexed away from the spring finger 20. Thus at the "light toast" end of the adjustment, the device functions as a manually-operable switch to open the circuit of the toaster.

It will be seen that the features of this invention embodied in a toaster of the specific type disclosed greatly enhances the operation of the toaster and increases its efficiency and accuracy. Although the invention has been illustrated in a preferred specific form, it will be understood that changes or modifications may be made within the scope of the invention as defined by the appended claims.

We claim:

1. In a toaster, heat-responsive means arranged for response to the temperature of the bread being toasted and adapted to control the toasting operation, means for supporting the bread slice adjacent said heat-responsive means, and a plurality of curved pressure bars on said supporting means designed and arranged to engage and press the slice of bread against said heat-responsive means with uniform pressure regardless of the thickness of the bread slice within the ordinary range thereof.

2. In a toaster, heat-responsive means arranged for response to the temperature of the bread being toasted and adapted to control the toasting operation, means for supporting the bread slice adjacent said heat-responsive means, and a curved frame on said supporting means designed and arranged to engage and press the slice of bread against said heat-responsive means with uniform pressure regardless of the thickness of the bread slice within the ordinary range thereof.

3. In a toaster, heat-responsive means arranged for response to the temperature of the bread being toasted and adapted to control the toasting operation, a door member adapted to support a slice of bread, means urging said door to closed position, and a plurality of curved pressure bars on said door designed and arranged to engage and press the slice of bread against said heat-responsive means with uniform pressure regardless of the thickness of the bread slice within the ordinary range thereof.

4. In a toaster, heat-responsive means arranged for response to the temperature of the bread being toasted and adapted to control the toasting operation, a door member adapted to support a slice of bread, means urging said door to closed position, and a plurality of convex pressure bars on said door with their convex portions arranged to engage and press the slice of bread against said heat-responsive means with uniform pressure regardless of the thickness of the bread slice within the ordinary range thereof.

5. In a toaster, heat-responsive means arranged for response to the temperature of the bread being toasted and adapted to control the toasting operation, a door member adapted to support a slice of bread, means urging said door to closed position, and a frame on said door having a convex portion arranged to engage and press the slice of bread against said heat-responsive means with uniform pressure regardless of the thickness of the bread slice within the ordinary range thereof.

6. In a toaster, a thermostatic element disposed within the heated body of the toaster and having a free end extending near the bottom of the toaster, a pair of switch contacts which are normally closed during operation of the toaster, a common pivotal support for said contacts within the base of the toaster serving to support the contacts in cooperative relation with said free end, one of said contacts being actuatable by the said end to open the contacts when said element responds to a predetermined degree to the toasting operation, means within said base for adjusting said support to move said contacts relative to said free end and thereby vary the toasting operation, means for actuating said adjusting means from outside the toaster, and a stationary stop arranged cooperatively with said one contact so as to open said contacts independently of said element when the contacts are moved by said adjusting means to a predetermined position.

7. In a toaster, a thermostatic element, a pair of switch contacts which are normally closed during operation of the toaster, a common pivotal support for said contacts within the base of the toaster serving to support the contacts in cooperative relation with said element, one of said contacts being actuatable by said element to open the contacts when said element responds to a predetermined degree to the toasting operation, means within said base for adjusting said support to move said contacts relative to said element and thereby vary the toasting operation, means for actuating said adjusting means from outside the toaster, and a stationary stop arranged cooperatively with one of said contacts so as to open said contacts independently of said element when the contacts are moved by said adjusting means to a predetermined position.

8. In a toaster, a thermostatic element, a pair of switch contacts which are normally closed during operation of the toaster, a common pivotal support for said contacts within the base of the toaster serving to support the contacts in cooperative relation with said element, said support having a crank arm, one of said contacts being actuatable by said element to open the contacts when said element responds to a predetermined degree to the toasting operation, a cam within said base having an eccentric slot within which said crank arm extends, whereby said support is adjustable to move said contacts relative to said element and thereby vary the toasting operation, means for actuating said cam from outside the toaster, and a stationary stop arranged cooperatively with said one contact so as to open said contacts independently of said element when the contacts are moved by said cam to a predetermined position.

9. In a toaster, a thermostatic element, a pair of switch contacts which are normally closed during operation of the toaster, means within the base of the toaster for supporting the contacts in cooperative relation with said element, one of said contacts being actuatable by said element to open the contacts when said element responds to a predetermined degree to the toasting operation, means within said base for adjusting said contacts relative to said element and thereby vary the toasting operation, means for actuating said adjusting means from outside the toaster, and a stationary stop arranged cooperatively with one of said contacts so as to open said contacts independently of said element when the contacts are moved by said adjusting means to a predetermined position.

10. In a toaster, a thermostatic element disposed within the heated body of the toaster and having a free end exposed near the bottom of the toaster, a pair of switch contacts which are normally closed during operation of the toaster, a common pivotal support for said contacts within the base of the toaster, serving to support the contacts in cooperative relation with said free end, one of the contacts being actuatable by the said free end to open the contacts when said element responds to a predetermined degree to the toasting operation, means within said base for adjusting said support to move said contacts relative to said free end and thereby vary the toasting operation, means for actuating said adjusting means from outside the toaster, means for supporting a bread slice adjacent said thermostatic element, and a pressure bar actuated by said supporting means to engage and press a slice of bread against said thermostatic element.

JOSEPH W. MYERS.
GEORGE M. BIDDINGER.